US008495721B1

(12) United States Patent
Moody et al.

(10) Patent No.: US 8,495,721 B1
(45) Date of Patent: Jul. 23, 2013

(54) DATA NETWORK SECURITY POLICIES

(75) Inventors: Peter Moody, San Francisco, CA (US); Paul A. Watson, Thornton, CO (US)

(73) Assignee: Google Inc., Mountain View, CA (US)

( * ) Notice: Subject to any disclaimer, the term of this patent is extended or adjusted under 35 U.S.C. 154(b) by 404 days.

(21) Appl. No.: 12/827,173

(22) Filed: Jun. 30, 2010

(51) Int. Cl.
*H04L 29/00* (2006.01)
(52) U.S. Cl.
USPC ........ 726/9; 726/10; 726/11; 726/12; 726/13; 726/14
(58) Field of Classification Search
USPC ....................................................... 726/9–14
See application file for complete search history.

(56) References Cited

U.S. PATENT DOCUMENTS

2006/0288404 A1* 12/2006 Kirshnan et al. .................. 726/5
2008/0040775 A1*  2/2008 Hoff et al. .......................... 726/1
2009/0249465 A1* 10/2009 Touboul ........................... 726/11

OTHER PUBLICATIONS

B. Zhang et al. "Specifications of a High-level Conflict-Free Firewall Policy Language for Multi-domain Networks," Proc. 12th ACM Sym. Access Control Models and Technologies, SACMAT'07, Jun. 20-22, 2007, Sophia Antipolis, France p. 185-194 (2007).
BEA Systems, Inc. "BEA AquaLogic Enterprise Security™: Managing Entitlements—The Next Phase of Application Security," p. 1-17 (Sep. 2005).
Chapt. 11 of "The IT Regulatory and Standards Compliance Handbook," by Craig S. Wright, entitled "Testing the Firewall," available at http://media.techtarget.com/searchSecurityChannel/downloads/Ch11_SA266.pdf, p. 275-298 (Jun. 5, 2008).
K. Ingham et al. "A History and Survey of Network Firewalls," available at http://www.cs.unm.edu/~moore/tr/02-12/firewall.pdf (2002).
NetCitadel, LLC, "Firewall Builder 4.0 User's Guide," available at http://www.fwbuilder.org/UsersGuide4.pdf, Copyright 2003, 2010.
S. Pozo et al. "AFPL2, An Abstract Language for Firewall ACLs with NAT support," Proc. 2009 2nd Int. Conf. Dependability, p. 52-59 (2009).
V. Kurland, "Firewall Builder," 11th DFN-CERT Workshop, Hamburg, Germany, Feb. 2004, ISBN 3-00-012959-6 available at http://www.fwbuilder.org/4.0/docs/dfncert-epaper.pdf, (2004).
V. Zaliva , "Firewall Policy Modeling, Analysis and Simulation: a Survey," available at htip://www.crocodile.org/lord/fwpolicy.pdf, May 9, 2008.
V. Zaliva, "Platform-Independent Firewall Policy Representation," available at http://www.crocodile.org/lord/FWBPolicy.pdf, Dec. 2, 2007.

(Continued)

*Primary Examiner* — Ghazal Shehni
(74) *Attorney, Agent, or Firm* — Fish & Richardson P.C.

(57) ABSTRACT

Methods, systems, and apparatus, including computer programs encoded on a computer storage medium, for specifying a data network security policy. In one aspect, a system includes a device-agnostic firewall policy that defines one or more rules for regulating data traffic on a data network. The device-agnostic firewall policy includes a policy definition and a security component. The policy definition delineates regulation of the data network traffic to be implemented by a firewall and a policy token definition that delineates a token used in the policy definition. The security component is implemented in hardware, in software executed on a data processing device, or in a combination thereof and is configured to permit a first group of one or more individuals to change both the policy definition and the policy token definition and a second group of one or more individuals to change the policy token definition while restricting the second group from changing the policy definition.

18 Claims, 5 Drawing Sheets

OTHER PUBLICATIONS

"Enterprise Firewall Types", National Security Agency [online]. Jul. 14, 2006 [retrieved on Jul. 19, 2010]. Retrieved from the Internet: <URL: http://www.nsa.gov/ia/_files/support/I73-001-06.pdf>, 2 pgs.

"Firewall Builder Release Notes", fwbuilder.org [online]. 2000-2008, NetCitadel, LLC [retrieved on Jul. 19, 2010]. Retrieved from the Internet: <URL: http://www.fwbuilder.org/4.0/docs/firewall_builder_release_notes.html>, 45 pgs.

* cited by examiner

DATA NETWORK SECURITY POLICIES

BACKGROUND

This specification relates to digital data processing and, in particular, to data network security policies.

A data network allows computers and other data processing devices to exchange information. A given data network can be part of a larger data network that includes other networks, can itself include multiple networks, or both. The boundaries between networks can be defined by logical associations of data processing devices, e.g., by network (or subnetwork) address. Network boundaries are often defined by human users so that a collection of data processing devices operated by an enterprise is found within a single network, i.e., an enterprise network. A single enterprise can also operate multiple data networks. Network boundaries—within and outside of an enterprise network—can also be defined by human users in accordance with physical location or other boundaries. For example, the residential dormitories of a university may be spanned by a local area network, whereas the engineering division at different sites of a multinational corporation may be interconnected by a wide area network.

Data networks are generally secured to ensure that information on the network cannot be accessed by unauthorized individuals, that the data on the network is authentic, or both. One example of a data network security mechanism is a firewall. A firewall is a system of one or more data processing devices that secure a data network and enforce network security. The data processing devices can be implemented in hardware, in software executed on a data processing device, or in combinations thereof. Firewalls are generally positioned at the boundary of a data network or subnetwork and regulate the traffic entering and exiting the data network or subnetwork. Firewalls regulate this traffic in accordance with a set of rules that have been specified in advance, e.g., by a network security administrator. This set of rules—also referred to as a firewall's policy—can include filtering rules that describe how traffic exchanged with the data network or subnetwork is to be filtered.

SUMMARY

In a first aspect, a system includes a device-agnostic firewall policy that defines one or more rules for regulating data traffic on a data network. The device-agnostic firewall policy includes a policy definition and a security component. The policy definition delineates regulation of the data network traffic to be implemented by a firewall and a policy token definition that delineates a token used in the policy definition. The security component is implemented in hardware, in software executed on a data processing device, or in a combination thereof and is configured to permit a first group of one or more individuals to change both the policy definition and the policy token definition and a second group of one or more individuals to change the policy token definition while restricting the second group from changing the policy definition.

This first aspect, along with the second, third, and other aspects, can include one or more of the following features. The security component also can be configured to restrict the second group from creating a new policy definition or ending an existing policy definition. The policy token definition can include a keyword that identifies a characteristic of the functionality of the defined policy term and a token that is associated with the keyword and applied to the characteristic of the functionality identified by the keyword.

The token can specify one of a collection of one or more source addresses, a collection of one or more destination addresses, a collection of one or more ports, a collection of one or more protocols, and a collection of one or more actions to be taken. The security component can be configured to permit the second group to change the definition of the token and prohibit the second group from changing the association of the keyword with the token. The security component can be configured to prohibit the second group from changing a target definition that defines a class of devices targeted by a translation of the device-agnostic firewall policy into a device-specific firewall policy. The system can also include a revision control component configured to track and manage changes made by individuals in the first and second groups. The policy definition and the policy token definition can be expressed in text. The revision control component can track and manage the changes to the text of the policy definition and the policy token definition.

In a second aspect, a method can be implemented by a security component, for specifying a data network security policy. The method can include permitting, by the security component, a first group of one or more individuals to change both policy definitions that delineate regulation of data network traffic to be implemented by a network security mechanism and policy token definitions that delineate tokens used in the policy, permitting, by the security component, a second group of one or more individuals to change the policy token definitions while restricting, by the security component, the second group from changing the policy definitions, and restricting, by the security component, a third group of one or more individuals from changing either the policy token definitions or the policy definitions.

This second aspect, along with the first, third, and other aspects, can include one or more of the following features. The policy token definitions each can include a keyword that identifies a characteristic of the functionality of the defined policy term and a token that is associated with the keyword and applied to the characteristic of the functionality identified by the keyword. The token can specify one of a collection of one or more source addresses, a collection of one or more destination addresses, a collection of one or more ports, a collection of one or more protocols, and a collection of one or more actions to be taken. Permitting the second group to change the policy token definitions can include permitting the second group to change a definition of the token. Restricting the second group from changing the policy definitions can include prohibiting the second group from changing the associations of the keywords with the tokens. Prohibiting the second group from changing the associations of the keywords with the tokens can include prohibiting the second group from ending an association between a first keyword and a first token. Prohibiting the second group from changing the associations of the keywords with the tokens can include prohibiting the second group from creating a new association between a first keyword and a first token. The method can include permitting, by the security component, the second group to access the policy definitions.

In a third aspect, a system can include a firewall policy that defines one or more rules for filtering data traffic on a data network, the firewall policy defined using terms that associate keywords that each identify a characteristic of functionality of the filter with respective tokens that each apply to the characteristic of the functionality identified by the associated keyword, and a security component implemented in hardware, in software executed on a data processing device, or in a combination thereof, the security component configured to permit a first group of one or more individuals to change both the associations between the keywords and the tokens and definitions of the tokens and to permit a second group of one or more individuals to change the definitions of the tokens while restricting the second group from changing the associations between the keywords and the tokens.

This third aspect, along with the first, second, and other aspects, can include one or more of the following features. The security component can also be configured to restrict the second group from creating a new filter definition or from ending an existing filter definition and to permit the first group to create a new filter definition or to end an existing filter definition. The firewall policy can be device-agnostic. The system can include a translator implemented in hardware, in software executed on a data processing device, or in a combination thereof. The translator can be configured to implement translation rules to translate the device-agnostic policy into a collection of different device-specific policies. The system can include a revision control component configured to track and manage changes made by individuals in the first and second groups. The keywords, the tokens, and their associations can be expressed in text. The revision control component can track and manage the changes to the text. The tokens can specify a collection of one or more source addresses, a collection of one or more destination addresses, a collection of one or more ports, a collection of one or more protocols, and a collection of one or more actions to be taken.

Particular embodiments of the subject matter described in this specification can be implemented so as to realize one or more of the following advantages. A (e.g., device-agnostic) firewall or other security policy can be expressed using a group of policy definitions and a group of policy token definitions. A network security device can allow one or more individuals to access and/or change policy token definitions but restrict those same individuals from accessing and/or changing policy definitions. The details of one or more implementations described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
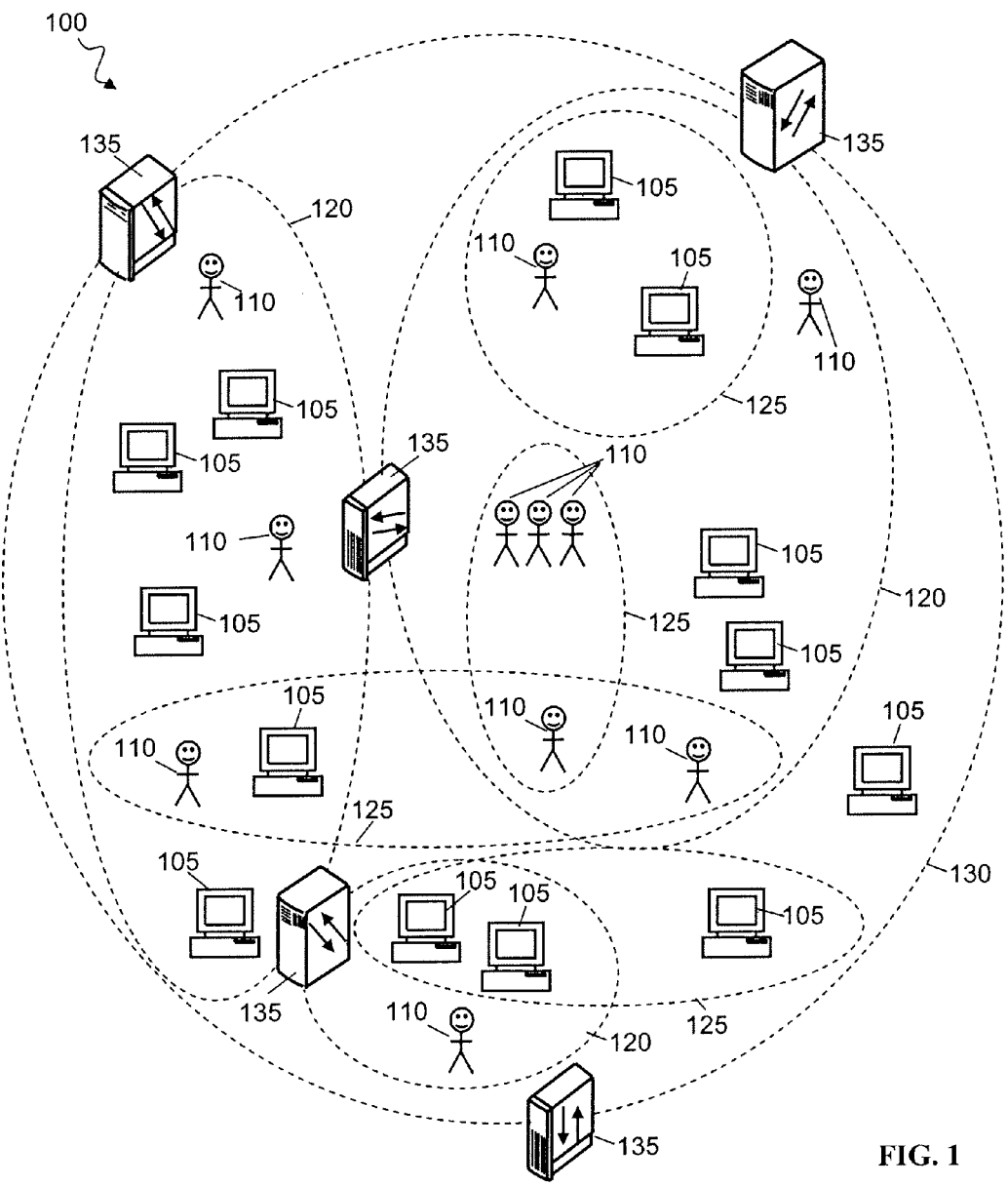
FIG. 1 is a schematic representation of an example data network system.

FIG. 1 is a schematic representation of an example data network system 100. Data network system 100 is a communications network that exchanges data between data processing devices and/or personnel. Data can be exchanged internally within data network system 100 (e.g., between devices and/or personnel that are within data network system 100) and data can be exchanged across an outer boundary of data network system 100 (e.g. between devices and/or personnel that are within data network system 100 and devices and/or personnel that are outside of data network system 100). In some instances, data network system 100 can be an enterprise network that is operated for the benefit of a single enterprise, such as a corporation, a school, a governmental entity, or the like.

Data network system 100 includes both data processing devices 105 and personnel 110. Different data processing devices 105 and different personnel 110 have different characteristics and these characteristics can be impact the disposition of devices 105 and personnel 110 within data network system 100. Examples of such characteristics include physical location, the unit of the enterprise to which devices 105 and personnel 110 are assigned, and the roles of devices 105 and personnel 110 within the enterprise for which data network system 100 is operated. These dispositions of data processing devices 105 and personnel 110 in data network system 100 can embody these and other characteristics.

Boundaries 120, 125 between logical divisions of groups of one or more data processing devices 105 and/or personnel 110 can be established in accordance with the dispositions and shared characteristics of different data processing devices 105 and/or personnel 110. Different boundaries 120, 125 can impact the exchange of data in data network system 100 in different ways. For example, in the illustrated implementation, boundaries 120 demarcate subnetworks within data network system 100. The data processing devices 105 within each subnetwork boundary 120 can be addressed using a shared portion of a network address.

As another example, boundaries 125 can demarcate devices 105 and/or personnel 110 that are to, e.g., receive certain communications or be granted access to certain services within data network system 100. For example, a group of devices 105 and/or personnel 110 can be assigned to a single division of an enterprise or work in a related capacity within the enterprise. A boundary 125 that encompasses such a group of devices 105 and/or personnel 110 may or may not cut across subnetwork boundaries 120.

The logical division between data network system 100 and one or more other data networks is schematically represented by a boundary 130. In some implementations, boundary 130 demarcates data network system 100 from a publicly accessible computer network such as the Internet. In other implementations, boundary 130 demarcates data network system 100 from other portions of a private network. For example, boundary 130 can be a subnetwork boundary that demarcates a subnetwork data network system 100 from a larger enterprise or other network.

Data network system 100 also includes a collection of router devices 135 that are each responsible for implementing a security mechanism. For example, router devices 135 can implement firewalls that regulate the traffic entering and exiting the respective of data network 100 or the subnetworks demarcated by boundaries 120. In some instances, router devices 135 are heterogeneous devices that are sold by different vendors and implement policies using different linguistic, logical, or other approaches.

Specifying policies for firewalls such as those implemented by router devices 135 can be error-prone and complicated. For example, a network security administrator may be required to write and maintain separate firewall policies for different classes of router devices 135. Further, a policy may be changed for one class of router device and, by error or otherwise, may not be changed for other classes of router devices. Inconsistent and erroneous security policies could result.

Figure 2:
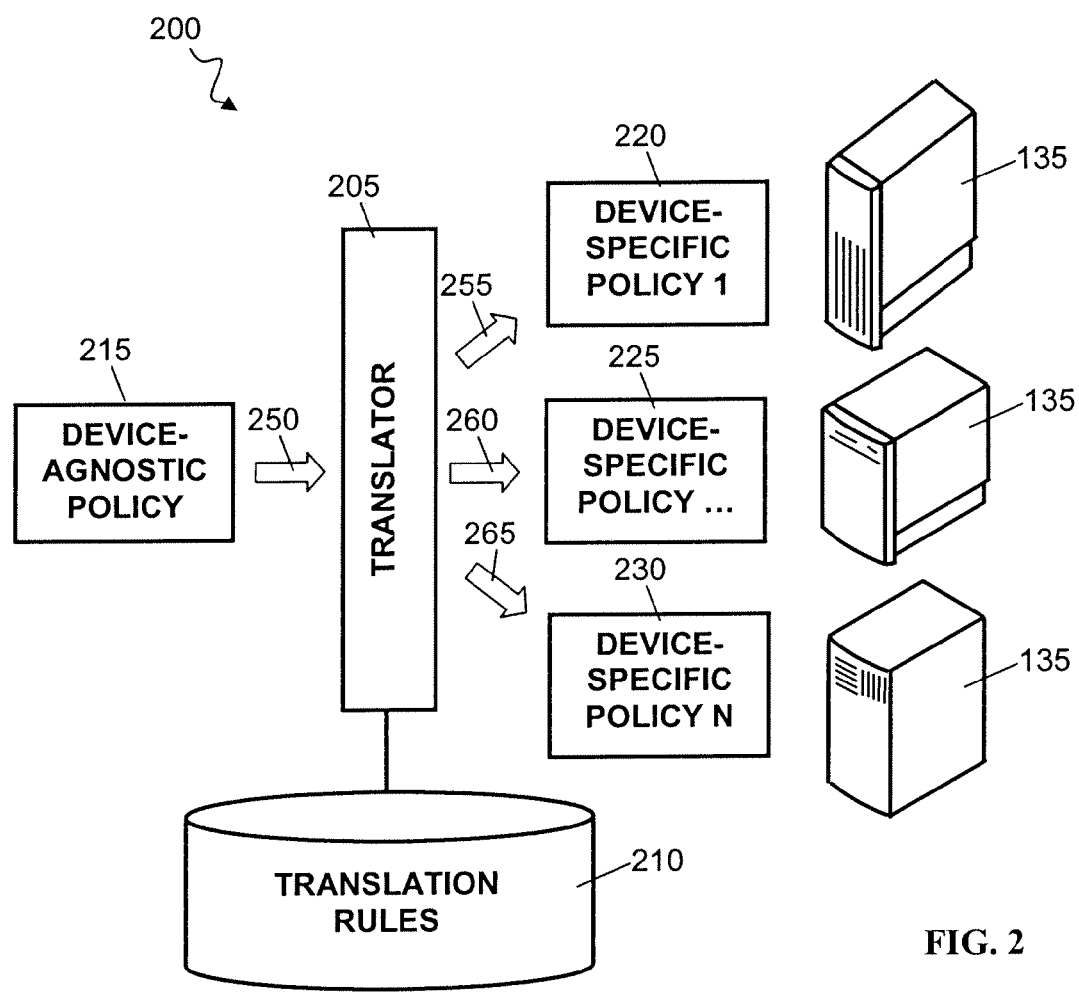
FIG. 2 is a schematic representation of an example system for specifying security policies that are implemented by firewalls or other network security mechanisms.

FIG. 2 is a schematic representation of an example system 200 for specifying security policies that are implemented by firewalls or other network security mechanisms. For example, system 200 can be used to specify the security policies that are implemented by router devices 135 in data network system 100 (FIG. 1).

System 200 includes a translator 205 that implements a collection of translation rules 210 to translate a device-agnostic policy 215 into a collection of different device-specific policies 220, 225, 230. Translator 205 can be, e.g., a system of one or more data processing devices that performs operations in accordance with the logic of a set of machine-readable instructions. These machine-readable instructions can include translation rules 210.

Translation rules 210 are machine-readable instructions that embody defined activities for translating device-agnostic policy 215 into device-specific policies 220. Translation rules 210 can be stand-alone instructions (such as an executable software program) or translation rules 210 can be a table or other set of heuristics that can be accessed and used by translator 205 during translation. Translation rules 210 can be stored in one or more data storage media.

Device-agnostic policy 215 is a set of rules for regulating data traffic on a data network. Device-agnostic policy 215 can include filtering rules that embody how traffic exchanged with the data network or subnetwork is to be filtered. Device-agnostic policy 215 is agnostic in that device-agnostic policy 215 is generally not directly implementable by any particular security mechanism. Rather, device-agnostic policy 215 must first be translated into a device-specific policy 220 that is in accordance with the linguistic and other requirements of the implementing device prior to implementation.

In some instances, device-agnostic policy 215 can itself be a translation of a device-specific policy. For example, in some implementations, a device-specific policy can be made device-agnostic by translating the device-specific policy into device-agnostic policy 215. A device-agnostic policy 215 that is formed in this way can then be translated into different device-specific policies 220, 225, 230.

Device-agnostic policy 215 can be expressed using a group of policy definitions and a group of policy token definitions. A network security device can allow one or more individuals to access and/or change policy token definitions but restrict those same individuals from accessing and/or changing policy definitions, as discussed further below. In some implementations, device-agnostic policy 215 can be expressed using expressions such as those described below.

Device-specific policies 220, 225, 230 are each rules for regulating network traffic that are specifically implementable by a network security device or a class of network security devices. Examples of device-specific policies 220, 225, 230 includes commercial firewall policies that are based on routing platforms and host-based firewall policies. Examples of commercial firewalls that are based on routing platforms include, e.g., CISCO policies (extended, non extended and a special object-group format, ipv4 and ipv6), JUNIPER policies (ipv4 ipv6, regular firewall filters and bridge filters), and SILVERPEAK policies. Examples of host-based firewall policies include, e.g., LINUX (iptables), openBSD, and FreeBSD.

In operation, translator 205 can receive device-agnostic policy 215 at 250. Using translation rules 210, translator 205 can translate the single device agnostic policy 215 into the different device-specific policies 220, 225, 230. Translator 205 can also output each of the device-specific policies 220, 225, 230 to a corresponding device that implements a respective security mechanisms at 255, 260, 265. For example, translator 205 can output respective device-specific policies 220, 225, 230 to a device that can implement a firewall in accordance with the received policy. For example, in the context of data network system 100, translator 205 can output appropriate matching device-specific policies 220, 225, 230 to each of the router devices 135.

Figure 3:
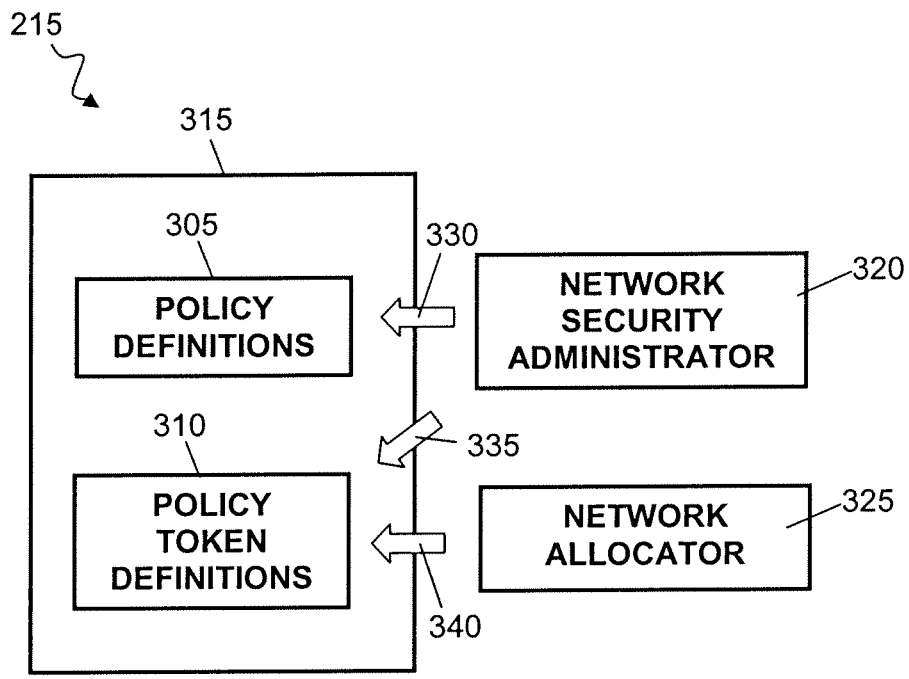
FIG. 3 is a schematic representation of an example device-agnostic policy.

FIG. 3 is a schematic representation of a device-agnostic policy 215. Device-agnostic policy 215 includes a collection of policy definitions 305 and a collection of policy token definitions 310. Policy definitions 305 delineate the regulation of traffic that is to be implemented by firewalls or other network security mechanisms. For example, policy definitions 305 can define one or more filters, with each filter including one or more terms. Terms included in policy definitions 305 can specify features of the filter, such as source and/or destination addresses of traffic, ports, protocols, and actions that are to be taken on such traffic.

Policy token definitions 310 delineate tokens that are used in policy definitions 305 to delineate the regulation of traffic. Policy token definitions 310 can be used to specify characteristics of the features of the filter, such as which source and/or destination addresses belong to a category of addresses or which ports belong to a category of ports. In some instances, policy token definitions 310 can be used to delineate logical or other divisions within a network. For example, in the context of data network system 100, policy token definitions 310 can be used to delineate one or more boundaries 120, 125 (FIG. 1).

Device-agnostic policy 215 is protected by a security component 315. Security component 315 is a component that identifies personnel and/or data processing devices that seek to access or change device-agnostic policy 215 and restricts or allows those personnel and/or data processing devices to access or change device-agnostic policy 215. Security component 315 can be implemented in hardware or software. For example, security component 315 can be a source code management system (i.e., revision control software) that authenticates and authorizes users.

In restricting or allowing access or changes, security component 315 can group individuals and/or data processing devices into different categories with different levels of security authorization. For example, in the illustrated implementation, security component 315 groups individuals into three different categories, namely, network security administrator group 320, network allocator group 325, and everyone else (not shown). Network security administrator group 320 is a group of one or more individuals who are permitted by security component 315 to access and change both policy definitions 305 and policy token definitions 310, as represented schematically by arrows 330, 335.

Network allocator group 325 is a group of one or more individuals who are permitted by security component 315 to access and change policy token definitions 310, as represented schematically by arrow 340. The members of network allocator group 325 are however prohibited from changing policy definitions 305 and, in some implementations, may be prohibited from accessing policy definitions 305 as well. The members of network allocator group 325 are thus allowed to redefine the policy token definitions 310 that are used in policy definitions 305 to delineate the regulation of traffic but not allowed to redefine policy definitions 305, create a new policy definition, or end an existing policy definition. In some instances, the members of network allocator group 325 may also be prohibited from accessing policy definitions 305.

In the illustrated implementation, security component 315 prohibits everyone else (e.g., individuals who are not members of either network security administrator group 320 or network allocator group 325) from accessing and changing either policy definitions 305 or policy token definitions 310. In some implementations, security component 315 may however permit read access to, e.g., either of policy definitions 305 or policy token definitions 310 to another group or to a everyone else who is a member of an enterprise.

In some implementations, security component 315 can establish groups based not only on the identity of the individual who is seeking to access and/or change policy definitions 305 or policy token definitions 310, but also on the device that the individual is using at that time. For example, security component 315 may require that an individual use a physically secured terminal when policy definitions 305 are changed.

Security component 315 thus establishes multiple levels of security clearance and distinguishes between:
- individuals who are authorized to access and change both policy definitions 305 and policy token definitions 310;
- individuals who are authorized to access and change policy token definitions 310 but are prohibited from changing policy definitions 305; and
- individuals who are prohibited from changing both policy token definitions 310 and policy definitions 305.

A security component 315 having multiple levels of security clearance provides several advantages. For example, device-agnostic policy 215 can readily be adapted by even lower-clearance personnel to workaday changes in an enterprise. Examples of such workaday changes include personnel joining or leaving an enterprise, new equipment being deployed, old equipment being retired, and existing personnel or equipment being reassigned to different roles within an enterprise. Nevertheless, policy definitions 305 can remain secure and defined in accordance with the wishes of higher-clearance personnel.

Figure 4:
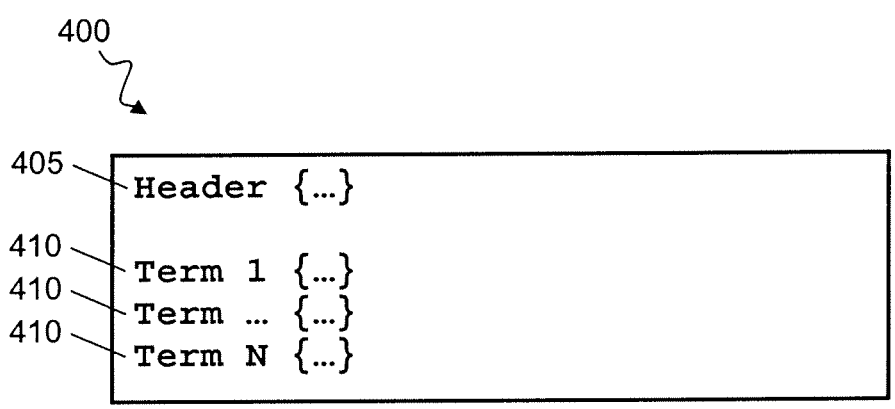
FIG. 4 is an example of a filter definition.

FIG. 4 is an example of a device-agnostic policy definition 305, namely, a filter definition 400. Filter definition 400 includes a header 405 and one or more terms 410. Header 405 identifies the filter that is defined in filter definition 400. As discussed further below, header 405 can in some implementations include fields that identify the name of filter, the type of the filer, the direction of the filter, and the format of the filter. Terms 410 each define access control rules implemented by the filter identified in header 405. As discussed further below, terms 410 can use keywords and tokens to specify the functionality of a filter that implements terms 410.

Figure 5:
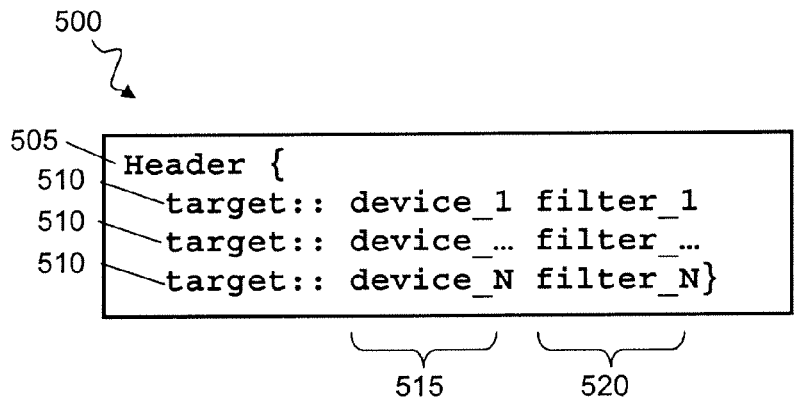
FIG. 5 is an example of a header that can be used in a filter definition.

FIG. 5 is an example of a header 500 that can be used in a filter definition such as filter definition 400. Header 500 includes text 505 that identifies header 500 as a header (also shown in FIG. 4) and collection of one or more target definitions 510. Target definitions 510 define the targeted implementation of the defined filter (i.e., the filter that is defined in the filter definition 400 that includes header 500). Target definition 510 can define a variety of characteristics of the targeted implementation of the filter including, e.g., the category of the device(s) to implement the filter and an identifier of the filter implemented by devices(s) of that category.

In the illustrated implementation, each target definition 510 includes a respective device identifier argument 515 and a respective filter identifier argument 520. Device identifier arguments 515 each identify a category of the device(s) that are to implement the filter. Examples of device identifier arguments 515 include identifiers of particular brands of network security devices that are to implement the defined filter (e.g., "JUNIPER" to identify JUNIPER NETWORKS of Sunnyvale, Calif. or "CISCO" to identify CISCO SYSTEMS of San Jose, Calif.) and identifiers of application programs that are to implement the defined filter (e.g., "iptables" available from NETFILTER.ORG). Filter identifier arguments 520 each include an identifier of the filter that is to be implemented. Filter identifier arguments 520 can be, e.g., a new name chosen by the personnel in an enterprise to designate the filter to be implemented or a name that is recognized by the device that is to implement the filter. For example, the application program iptables has inherent filters, such as "INPUT," "OUTPUT," and "FORWARD" and a filter identifier argument 520 for iptables can identify one of these filters.

In other implementations, one or more target definitions 510 can also include additional arguments that identify additional characteristics of the targeted implementation of the filter. Examples of such arguments include arguments that identify Internet Protocols for which the filters are to be implemented, arguments that identify access lists of the filters, and arguments that identify default policies of the filters.

Figure 6:
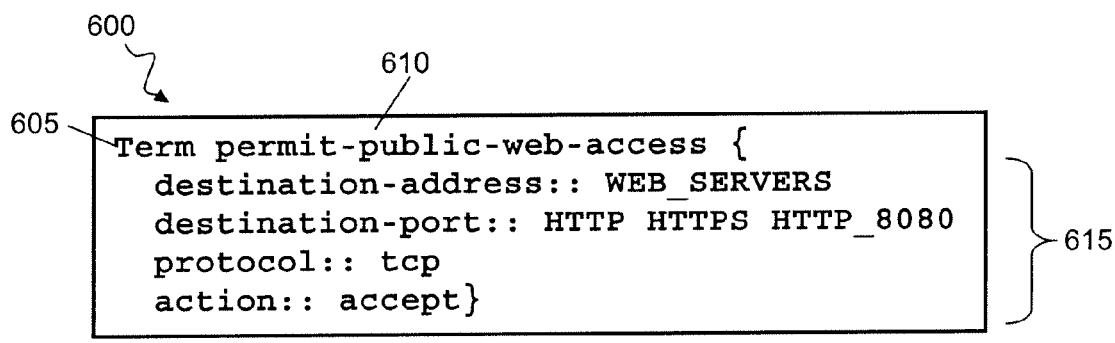
FIGS. 6 and 7 are example terms that can be used in a filter definition such as filter definition.
Figure 7:
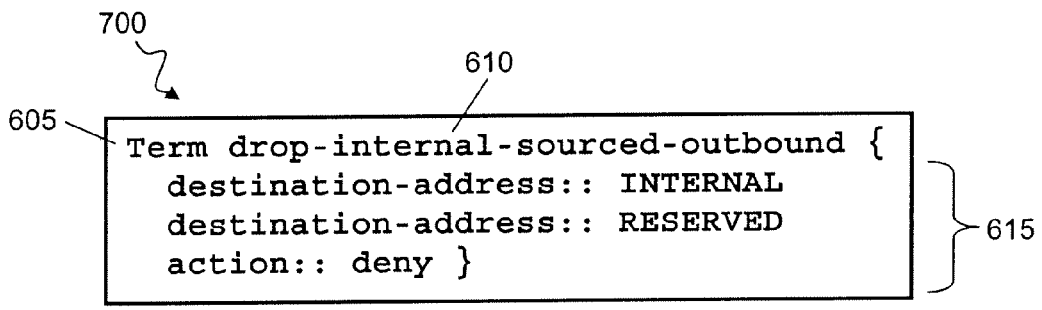
Figure 8:
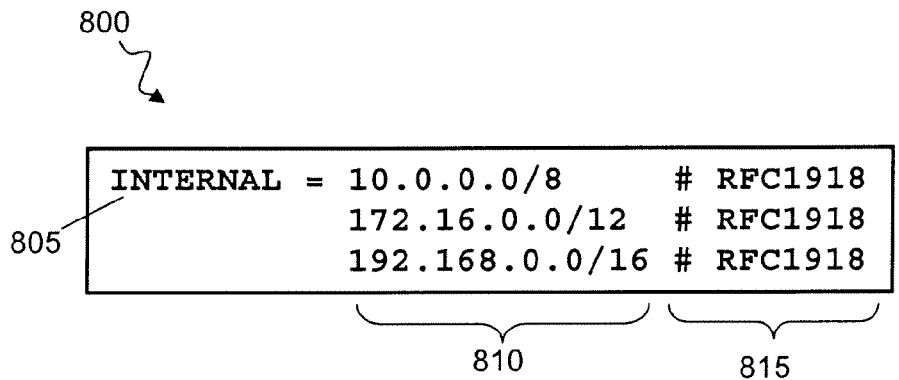
FIGS. 8, 9, 10, 11 are examples of a policy token definitions of tokens.
Figure 9:
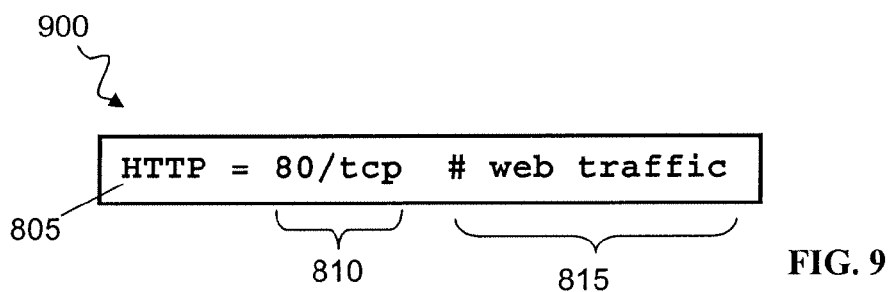
Figure 10:
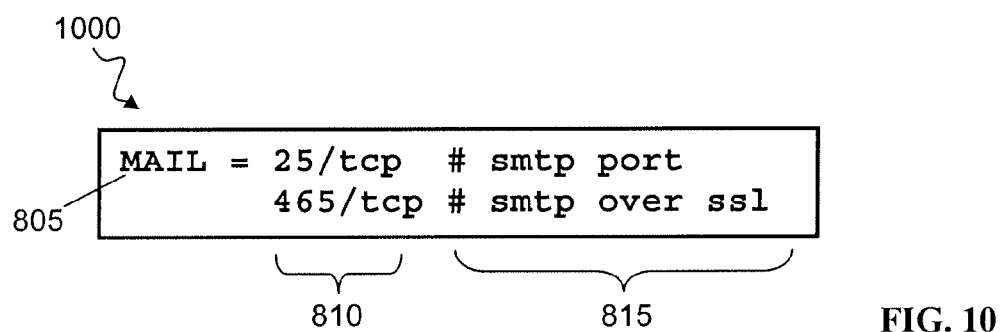
Figure 11:
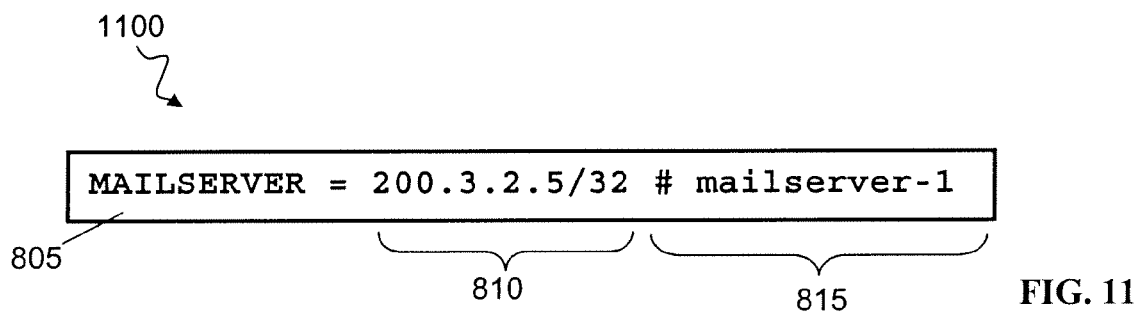

FIGS. 6 and 7 are example terms 600, 700 that can be used in a filter definition such as filter definition 400. Terms 600, 700 each includes text 605 that identifies the respective of terms 600, 700 as terms (also shown in FIG. 4), a term name 610 that uniquely identifies terms 600, 700, and a collection 615 of associated keywords and tokens that together define the functionality of the filter that implements terms 600, 700. Keywords are identifiers of characteristics of the functionality of the implemented filter. In general, keywords are textual. Keywords are generally predefined to be recognized by translation rules implemented by a translator (e.g., translator 205 (FIG. 2)) so that the functionality defined using the keywords can be effectively translated into device-specific policies. Examples of keywords are given in Table 1.

TABLE 1

| KEYWORD: | FUNCTIONALITY OF THE IMPLEMENTED FILTER |
|---|---|
| action: | The action that the filter takes in response to a match being. Can be associated with tokens such as accept, deny, reject, next, reject-with-tcp-rst. |
| destination-address: | A destination address to be matched by the filter. Can be associated with one or more destination address tokens. |
| destination-exclude: | A destination address to be excluded from a specified destination-address. |
| destination-port: | A destination port to be matched by the filter. Can be associated with one or more service definition tokens. |
| established: | The filter is only to permit established connections. |
| tcp-established: | The filter is only to permit established tcp connections. |
| sample: | The filter is to sample traffic for netflow. |
| initial: | The first TCP packet is to be matched by the filter ("tcp-initial" is appended to the term). |
| rst: | The tcp RST (reset) flag is to be matched by the filter ("tcp-flags rst" is to be appended to the term). |
| first-fragment: | The first fragment of a fragmented packet is to be matched by the filter ("first-fragment" is to be appended to the term). |
| protocol: | The network protocols that are to be matched by the filter. Can be associated with tokens such as tcp, udp, icmp, or numeric values. |
| protocol-except: | The network protocols that are to be excluded from matching by the filter. |
| source-address: | A source address to be matched by the filter. Can be associated with one or more source address tokens. |
| source-exclude: | A source address to be excluded from a specified source-address. |
| source-port: | A source port to be matched by the filter. Can be associated with one or more service definition tokens. |
| address: | An address to be matched by the filter. Can be associated with one or more network address tokens. |
| counter: | The filter is to update a counter for matching packets. |

TABLE 1-continued

| KEYWORD: | FUNCTIONALITY OF THE IMPLEMENTED FILTER |
|---|---|
| destination-prefix: | A prefix of a destination address to be matched by the filter. |
| ether-type: | Specify that arp packets are to be matched by the filter. |
| fragment-offset: | Specify a fragment offset of a fragmented packet to be matched by the filter. |
| icmp-type: | Specify the type of Internet Control Message Protocol (ICMP) used by the filter. Can be associated with tokens such as echo-reply, echo-request, port-unreachable. |
| logging: | Specify that the filter is to log a packet. |
| loss-priority: | Specify the loss priority of traffic for the filter. |
| packet-length: | Specify packet length for the filter. |
| policer: | Specify which policer that the filter is to apply to matching packets. |
| precedence: | Specify precedence for the filter. |
| qos: | The filter is to apply quality of service classification to matching packets. |
| routing-instance: | Specify routing instance for matching packets for the filter. |
| source-prefix: | Specify source-prefix matching for the filter. |
| traffic-type: | Specify traffic-type for the filter. |

Tokens are values that are applied to the characteristics of the functionality identified by an associated keyword. Tokens can be predefined to be recognized by translation rules implemented by a translator (e.g., translator 205 (FIG. 2)) or tokens can be custom-defined in policy token definitions 310 (FIG. 3). Examples of predefined tokens include tokens that designate protocols to be matched by the filter (e.g., tcp, udp, icmp) and tokens that designate actions to be taken by the filter in response to a match being found (e.g., accept, deny, reject, next, reject-with-tcp-rst).

FIGS. 8, 9, 10, 11 are examples of custom-defined policy token definitions of tokens 800, 900, 1000, 1100. In the illustrated implementations, each token 800, 900, 1000, 1100 includes a token identifier 805 and one or more token definitions 810. Token identifiers 805 are names or other unique identifiers of tokens 800, 900, 1000, 1100. Token definitions 810 are values that set forth the meaning of tokens 800, 900, 1000, 1100. For example, token definitions 810 can be Internet Protocol addresses that define address tokens, protocol names that define protocol tokens, and port names that define port tokens. Token definitions 810 can be constrained by a compiler to be in a format that is recognized by a translator (e.g., translator 205 (FIG. 2)). In some implementations, token policy definitions can be compiled independently of the terms in which they appear.

In the illustrated implementations, tokens 800, 900, 1000, 1100 each also includes a comment 815. Comments 815 are explanatory text embedded in tokens and intended to help human readers understand the token.

In operation, a security component (e.g., security component 315 (FIG. 3)) can identify personnel and/or data processing devices that seek to access or change the header and terms of a filter definition (e.g., header 500 and terms 600, 700 of filter definition 400), the associations between keywords and tokens in the terms, and the policy token definitions of tokens (e.g., tokens 800, 900, 1000, 1100). The security component can also restrict or allow the personnel and/or data processing devices to perform these activities based on groupings of the individuals and/or data processing devices into different categories with different levels of security authorization.

For example, the security component can allow a first group of individuals (e.g., those belonging to network security administrator group 320) to access and change the header and terms of a filter definition, the associations between keywords and tokens in the terms, and the policy token definitions of tokens. Policy token definitions can be changed, e.g., by changing the token identifier 805 (e.g., the token "PRODUCTION=1.1.1.1/32" can be renamed "PROD=1.1.1.1/32") or by changing token definition 810 (e.g., the token "PRODUCTION=1.1.1.1/32" can be redefined to "PRODUCTION=1.1.0.0/16").

The security component can allow a second group of individuals (e.g., those belonging to network allocator group 325) to access and change the policy token definitions of tokens but prohibit the same group from changing the associations between keywords and tokens in the terms and the header and terms of a filter definition. The security component can prohibit other individuals (e.g., everyone else) from changing any of the policy token definitions of tokens, the associations between keywords and tokens, and the header and terms of a filter definition.

In some implementations, the changes that are made to the header and terms of a filter definition, the associations between keywords and tokens in the terms, and the policy token definitions of tokens can be tracked using a revision control component. A revision control component is a component that tracks and manages changes made by different individuals. Revision control components are generally implemented by a data processing device that executes revision control software. With multiple individuals being allowed to make changes to the header and terms of a filter definition, the associations between keywords and tokens, and/or the policy token definitions of tokens, revision control can be important.

In the illustrated implementations, the policy token definitions of tokens (e.g., tokens 800, 900, 1000, 1100) are expressed in text. Revision control of such text is relatively straightforward.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus or data processing device(s). Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising: assigning a first security level to a first group of one or more individuals wherein the first security level allows the first group of one or more individuals to change policy definitions that delineate regulation of data network traffic to be implemented by a network security mechanism and policy token definitions that delineate tokens used in the policy definitions wherein the policy token definitions each comprise a keyword that identifies a characteristic of the functionality of a defined policy term and a token that is associated with the keyword and applied to the characteristic of the functionality identified by the keyword;

assigning a second security level to a second group of one or more individuals wherein the second security level allows the second group of one or more individuals to change the policy token definitions while restricting the second group of one or more individuals from changing the policy definitions;

assigning a third security level to a third group of one or more individuals wherein the third security level prevents the third group of one or more individuals from changing either the policy token definitions or the policy definitions;

receiving a request to change a first policy definition of the policy definitions;

determining that an individual associated with the request has been assigned the first security level;

based on the determining, translating the first policy definition using one or more translation rules from a device-agnostic policy to a plurality of different device-specific policies;

providing each of the device-specific policies to a respective device; and wherein assigning, receiving, determining and providing are performed by one or more computers.

2. The method of claim 1, wherein the token specifies one of a collection of one or more source addresses, a collection of one or more destination addresses, a collection of one or more ports, a collection of one or more protocols, and a collection of one or more actions to be taken.

3. The method of claim 1, wherein assigning the second security level to the second group of one or more individuals comprises:

prohibiting the second group of one or more individuals from changing the associations of the keywords with the tokens.

4. The method of claim 1, wherein assigning the second security level to the second group of one or more individuals comprises prohibiting the second group of one or more individuals from ending an association between a first keyword and a first token.

5. The method of claim 1, wherein assigning the second security level to the second group of one or more individuals comprises prohibiting the second group of one or more individuals from creating a Previously Presented association between a first keyword and a first token.

6. The method of claim 1 wherein one of the respective devices implements a network firewall.

7. A system comprising: a non-transitory computer storage medium having instructions stored thereon; and data processing apparatus programed to execute the instructions to perform operations comprising:

assigning a first security level to a first group of one or more individuals wherein the first security level allows the first group of one or more individuals to change policy definitions that delineate regulation of data network traffic to be implemented by a network security mechanism and policy token definitions that delineate tokens used in the policy definitions wherein the policy token definitions each comprise a keyword that identifies a characteristic of the functionality of a defined policy term and a token that is associated with the keyword and applied to the characteristic of the functionality identified by the keyword;

assigning a second security level to a second group of one or more individuals wherein the second security level allows the second group of one or more individuals to change the policy token definitions while restricting the second group of one or more individuals from changing the policy definitions;

assigning a third security level to a third group of one or more individuals wherein the third security level prevents the third group of one or more individuals from changing either the policy token definitions or the policy definitions;

receiving a request to change a first policy definition of the policy definitions;

determining that an individual associated with the request has been assigned the first security level;

based on the determining, translating the first policy definition using one or more translation rules from a device-agnostic policy to a plurality of different device-specific policies; and providing each of the device-specific policies to a respective device.

8. The system of claim 7, wherein the token specifies one of a collection of one or more source addresses, a collection of one or more destination addresses, a collection of one or more ports, a collection of one or more protocols, and a collection of one or more actions to be taken.

9. The system of claim 7, wherein assigning the second security level to the second group of one or more individuals comprises prohibiting the second group of one or more individuals from changing the associations of the keywords with the tokens.

10. The system of claim 7, wherein assigning the second security level to the second group of one or more individuals comprises prohibiting the second group of one or more individuals from ending an association between a first keyword and a first token.

11. The system of claim 7, wherein assigning the second security level to the second group of one or more individuals comprises prohibiting the second group of one or more individuals from creating a Previously Presented association between a first keyword and a first token.

12. The system of claim 7 wherein one of the respective devices implements a network firewall.

13. A non-transitory computer storage medium having instructions stored thereon that, when executed by data processing apparatus, cause the data processing apparatus to perform operations comprising:

assigning a first security level to a first group of one or more individuals wherein the first security level allows the first group of one or more individuals to change policy definitions that delineate regulation of data network traffic to be implemented by a network security mechanism and policy token definitions that delineate tokens used in the policy definitions wherein the policy token definitions each comprise a keyword that identifies a characteristic of the functionality of a defined policy term and a token that is associated with the keyword and applied to the characteristic of the functionality identified by the keyword;

assigning a second security level to a second group of one or more individuals wherein the second security level allows the second group of one or more individuals to change the policy token definitions while restricting the second group of one or more individuals from changing the policy definitions;

assigning a third security level to a third group of one or more individuals wherein the third security level prevents the third group of one or more individuals from changing either the policy token definitions or the policy definitions;

receiving a request to change a first policy definition of the policy definitions;

determining that an individual associated with the request has been assigned the first security level;

based on the determining, translating the first policy definition using one or more translation rules from a device-agnostic policy to a plurality of different device-specific policies;

providing each of the device-specific policies to a respective device; and wherein assigning, receiving, determining and providing are performed by one or more computers.

14. The computer storage medium of claim 13, wherein the token specifies one of a collection of one or more source addresses, a collection of one or more destination addresses, a collection of one or more ports, a collection of one or more protocols, and a collection of one or more actions to be taken.

15. The computer storage medium of claim 13, wherein assigning the second security level to the second group of one or more individuals comprises prohibiting the second group of one or more individuals from changing the associations of the keywords with the tokens.

16. The computer storage medium of claim 13, wherein assigning the second security level to the second group of one or more individuals comprises prohibiting the second group of one or more individuals from ending an association between a first keyword and a first token.

17. The computer storage medium of claim 13, wherein assigning the second security level to the second group of one or more individuals comprises prohibiting the second group of one or more individuals from creating a Previously Presented association between a first keyword and a first token.

18. The computer storage medium of claim 13 wherein one of the respective devices implements a network firewall.

* * * * *

UNITED STATES PATENT AND TRADEMARK OFFICE
CERTIFICATE OF CORRECTION

PATENT NO. : 8,495,721 B1  
APPLICATION NO. : 12/827173  
DATED : July 23, 2013  
INVENTOR(S) : Peter Moody and Paul A. Watson Page 1 of 1

It is certified that error appears in the above-identified patent and that said Letters Patent is hereby corrected as shown below:

In the Claims:

Column 13, line 43, in Claim 5, delete "Previously Presented" and insert -- new --, therefor.

Column 14, line 36, in Claim 11, delete "Previously Presented" and insert -- new --, therefor.

Column 15, lines 29-30, in Claim 17, delete "Previously Presented" and insert -- new --, therefor.

Signed and Sealed this  
Twelfth Day of November, 2013

Teresa Stanek Rea  
*Deputy Director of the United States Patent and Trademark Office*